(12) United States Patent
Gutierrez

(10) Patent No.: US 7,663,289 B1
(45) Date of Patent: Feb. 16, 2010

(54) CENTIPEDE ACTUATOR MOTION STAGE

(75) Inventor: Roman C. Gutierrez, Arcadia, CA (US)

(73) Assignee: Siimpel Corporation, Arcadia, CA (US)

( * ) Notice: Subject to any disclaimer, the term of this patent is extended or adjusted under 35 U.S.C. 154(b) by 755 days.

(21) Appl. No.: 11/061,145

(22) Filed: Feb. 18, 2005

Related U.S. Application Data

(60) Provisional application No. 60/546,100, filed on Feb. 18, 2004.

(51) Int. Cl.
*H02N 1/00* (2006.01)

(52) U.S. Cl. ...................................... 310/309

(58) Field of Classification Search .............. 310/309, 310/328, 323.02
See application file for complete search history.

(56) References Cited

U.S. PATENT DOCUMENTS

| | | | | |
|---|---|---|---|---|
| 5,338,997 | A | * | 8/1994 | Benecke ............... 310/307 |
| 5,808,383 | A | * | 9/1998 | Kostov et al. .......... 310/12 |
| 5,898,254 | A | * | 4/1999 | Kostov et al. .......... 310/309 |
| 5,952,766 | A | * | 9/1999 | Mukohjima et al. .... 310/323.04 |
| 6,657,359 | B1 | * | 12/2003 | Hoen et al. ............ 310/309 |
| 6,914,635 | B2 | | 7/2005 | Ostergard |

2001/0028203 A1 * 10/2001 Kasahara et al. ............ 310/309

FOREIGN PATENT DOCUMENTS

JP  5220680  *  8/1993

OTHER PUBLICATIONS

Machine translation, jp 2005-220680, "electrostatic actuator", Wataru Nakagawa and Michihiko Tsuruoka, Aug. 31, 1993.*
Akihiro Koga et al.; "Electrostatic Linear Microactuator Mechanism for Focusing a CCD Camera"; Journal of Lightwave Technology, vol. 17, No. 1; p. 43-47; Jan. 1999.

* cited by examiner

*Primary Examiner*—Karl I Tamai
(74) *Attorney, Agent, or Firm*—Haynes & Boone, LLP.

(57) ABSTRACT

A micro electromechanical actuator has movable flaps formed on a base plate. The flaps are detached from the base plate on the ends and along one side, with the opposite side being partially attached to the base plate by flexures. The flaps can be moved upward, rotating or twisting along the axis of the flexure so that a one side contacts a movable element first, followed by the opposite side. As a result, the movable element is moved laterally with respect to the flaps. Movement of the flaps can be by application of a voltage to the flaps, followed by removal of the voltage to return the flaps to their original position. The cycle can continue to move the movable element the desired amount.

11 Claims, 6 Drawing Sheets

//CENTIPEDE ACTUATOR MOTION STAGE

RELATED APPLICATIONS

The present application claims priority to provisional application Ser. No. 60/546,100, filed Feb. 18, 2004, entitled "Centipede Actuator Motion Stage".

BACKGROUND OF THE INVENTION

1. Field of the Invention

The present invention relates to actuators, and in particular micro electro mechanical (MEM) actuators.

2. Related Art

There is a recent surge of interest in camera systems for cell phone and other portable devices. This market has pushed the limits of standard optical systems in providing high quality zoom lens systems in a small package and at low cost. Current state-of-the art zoom lens systems use plastic and other low cost components to assemble moving lens assemblies. The motion of these lenses is typically driven using small electric motors. These systems have a lot of components and require complicated assembly to put together.

There is a need for an integrated actuated stage, where the actuator, the springs, and the guides are all integrated together. Further, there is a need to achieve the integration during wafer-level processing. This type of actuator also has many other applications.

SUMMARY

In one embodiment, the invention uses a micro electro mechanical system (MEMS). In one embodiment, the stage is composed of two planar components that are mounted one on top of the other: the base plate and the mount. The base plate contains an array of flaps that are actuated to move the mount. In one embodiment, the actuation of the flaps is electrostatic. The mount is supported to a frame using flexures or guides.

In one embodiment, the flaps are designed to provide a leveraged motion, such that the motion of the mount is less than the motion of the flaps. As a result, the force on the mount is larger than the force on the flaps.

In one embodiment, the stage contains all required elements needed to provide repeatable actuated motion of the mount. This includes springs or flexures to provide a repeatable restoring force, guiding to ensure straight motion of the mount, actuator and electronics to provide electronically controllable motion of the mount, and a package to limit the motion of the mount and prevent contamination of the actuator.

In one embodiment, a plurality of base plates are manufactured on a silicon wafer using micromachining, a plurality of mounts are manufactured on a silicon wafer using micromachining, and the two wafers are assembled such that all stages are assembled in parallel.

In one embodiment, the mount contains at least one hole shaped to receive an optical element. In another embodiment, the mount contains at least one hole shaped to contain a liquid.

These and other features and advantages of the present invention will be more readily apparent from the detailed description of the embodiments set forth below taken in conjunction with the accompanying drawings.

BRIEF DESCRIPTION OF THE FIGURES

Like reference numerals are used to identify like elements illustrated in one or more of the figures.

DETAILED DESCRIPTION

Figure 1A:
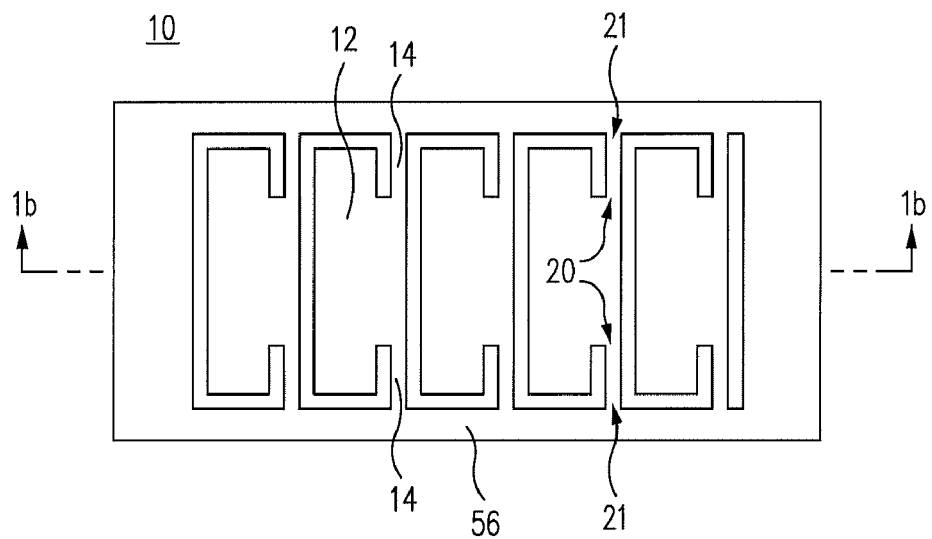
FIG. 1a is a top-view schematic illustration one portion of the stage according to one embodiment of the present invention.

FIG. 1a shows a top view of a base plate 10 according to one embodiment of the present invention. The base plate 10 is composed of a substrate 56 and an array of movable elements or flaps 12. Five flaps 12 are shown, although more or less flaps may be suitable for different applications. Each flap 12 is supported to the substrate through two flexures 14 (see also FIG. 1c). The flexures 14 are designed in such a way as to be very soft in rotation about the axis of the flexure and motion in a direction perpendicular to the plane of the substrate 56. All other degrees of freedom are relatively stiff. This can be achieved, for example, by a flexure 14 that is about 1 micron to 5 microns thick in the direction orthogonal to the plane of the substrate 56. Each flexure 14 may be 5 microns to 10 microns wide and 20 microns to 200 microns long. The length of the flexure is measured from the end 20 of the etched portion to the side 21 of the etched portion (see FIGS. 1a and 1c). Clearly, one of ordinary skill in the art may design flexures 14 of various shapes to achieve the necessary stiffnesses.

Figure 1B:
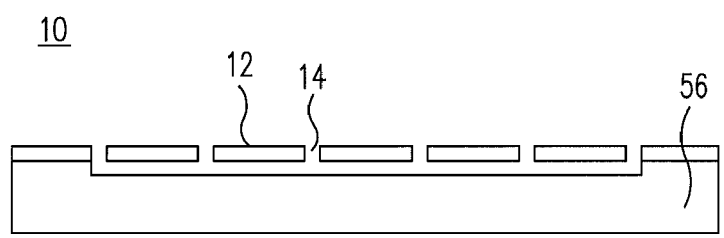
FIG. 1b is a cross-section schematic illustration of one portion of the stage according to one embodiment of the present invention.

FIG. 1b shows a cross-section view of the base plate 10 according to one embodiment of the present invention. From this view, it is clear that the flaps 12 are separated from the substrate 56, so that they are free to move and only restricted in motion by the flexures 14.

Figure 1C:
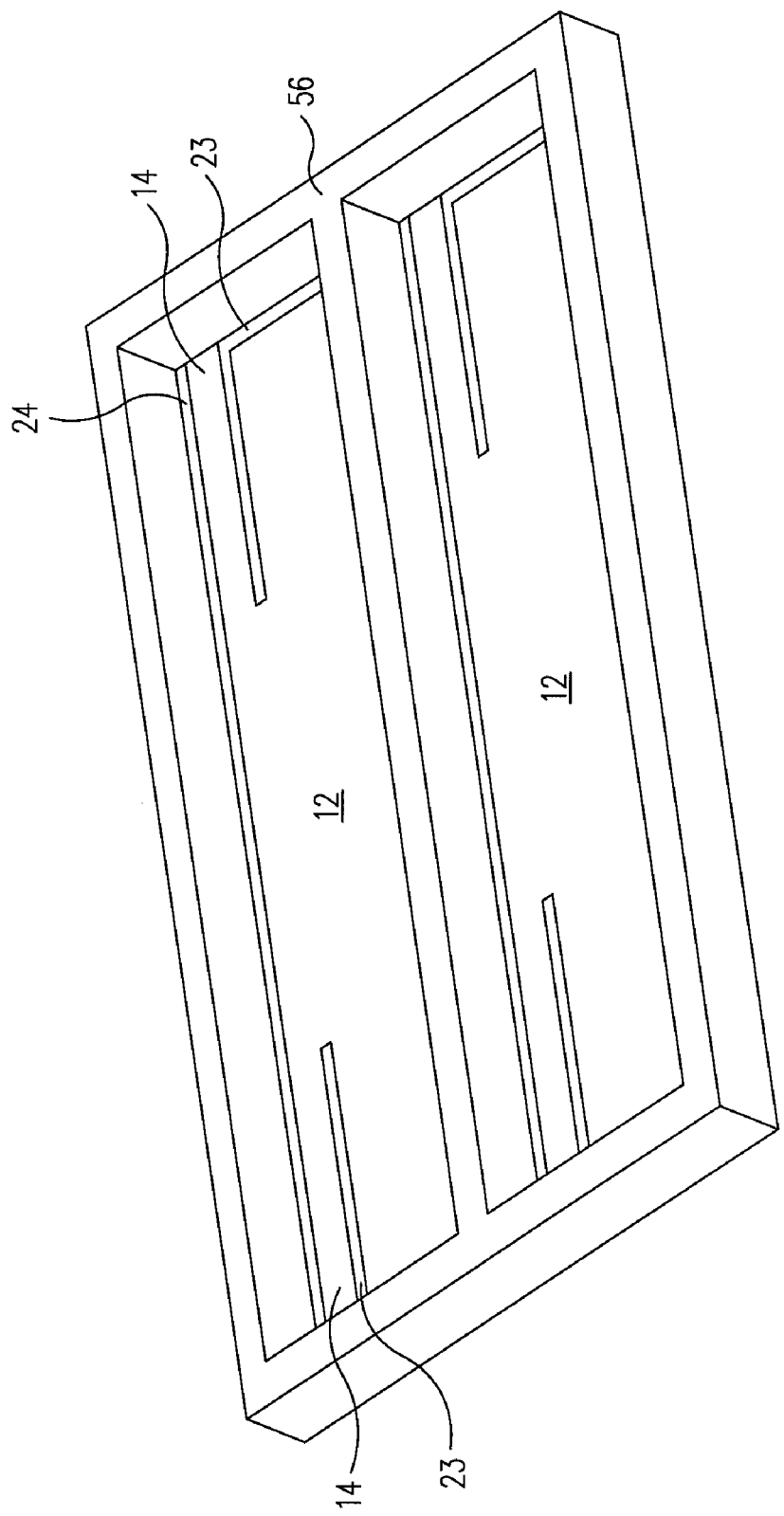
FIG. 1c is a perspective view of a portion of the stage showing two flaps according to one embodiment.

FIG. 1c is a perspective view of two flaps 12 formed from the substrate 56. As seen from the figure, the substrate 56 is etched with a C-shape along the complete length of one side of the flap, along the sides, and partially in the interior portion (shown by line 23) to form boundaries of the flap. The partial etching along with an etching (shown by line 24) parallel and adjacent to the length of the other side of the flap forms two flexures 14. Note that due to the angle, the etch along the length for the C-shaped etch is not shown, but that can be seen from FIG. 1a. Each flap 12 is supported on or connected to the substrate 56 by two flexures 14.

Figure 2:
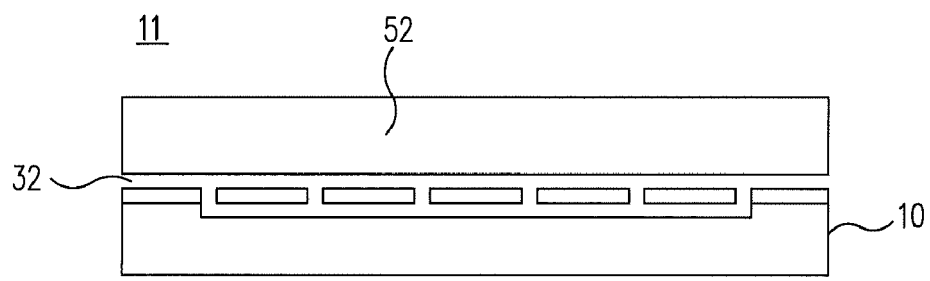
FIG. 2 is a schematic illustration of one embodiment of the stage at a first step in actuation.

FIG. 2 shows a motion stage 11 according to one embodiment of the current invention. The base plate 10 is assembled with a movable mount 52 such that there is a small gap 32 between the base plate 10 and the mount 52. The movable mount 52 is substantially free to move as long as the gap 32 is not closed and it is substantially restricted from moving towards the base plate 10. The flaps 12 are electrically connected to an electronic voltage signal, such that their electrostatic potential may be changed as desired. The movable mount 52 is electrically connected to electrical ground.

Figure 3A:
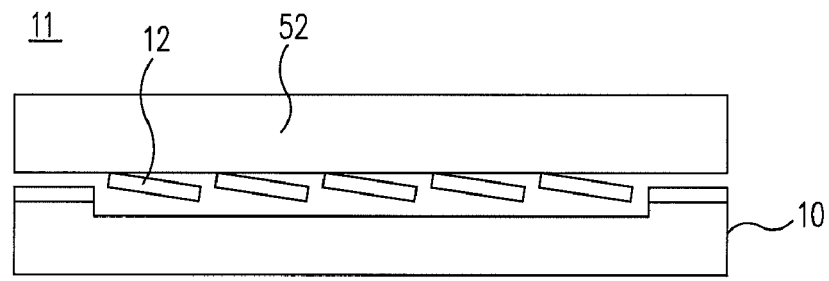
FIG. 3a is a schematic illustration of one embodiment of the stage at a second step in actuation.
Figure 3B:
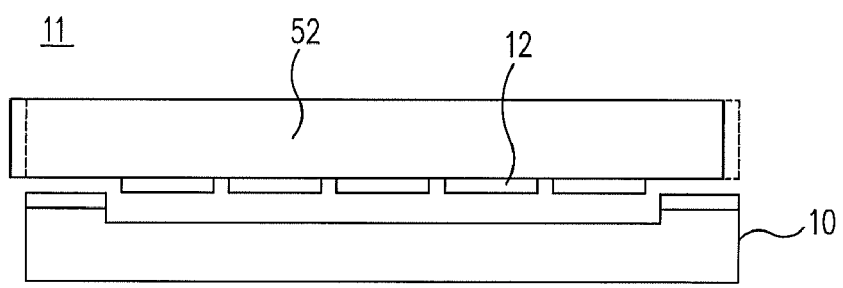
FIG. 3b is a schematic illustration of one embodiment of the stage at a second step in actuation.

FIGS. 3a and 3b show a method of actuating the motion stage 11 according to one embodiment of the current invention. In a first step, the voltage signal on the flaps 12 is changed from ground to a positive potential between 1 Volt and 300 Volts. The flaps 12 are designed such that the torque on the flaps 12 dominates the linear force. As a result, the flaps 12 rotate about the flexures 14 until one edge contacts the movable mount 52, as shown in FIG. 3a. This edge is shown as the left edge in FIG. 1a and the bottom edge in FIG. 1c. Once this contact happens, the friction between the flaps 12 and the movable mount 52 causes the movable mount 52 to move laterally (to the left) as the flaps 12 continue to move towards the movable mount 52, as shown in FIG. 3b. When the first edges contacts the moveable mount 52, the field strength increases to pull up the other side of the flap with the flexures. In a second step, the voltage on the flaps 12 is returned to 0 Volts and the flaps 12 separate from the movable mount 52, as shown in FIG. 2. This cycle is repeated to continue to move the movable mount 52 laterally to a desired position.

Figure 4A:
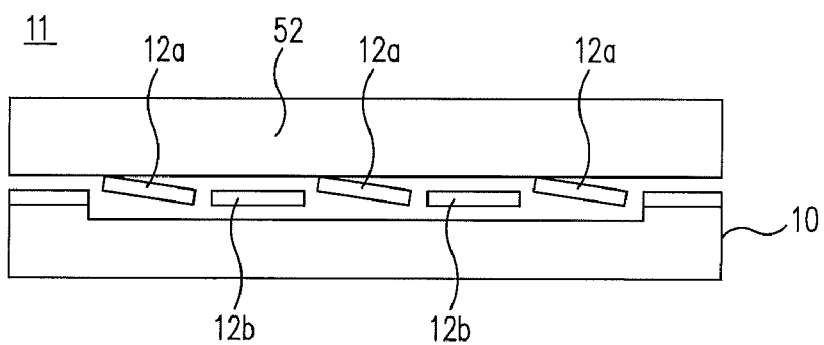
FIG. 4a is a schematic illustration of one embodiment of the stage at a first step in actuation.
Figure 4B:
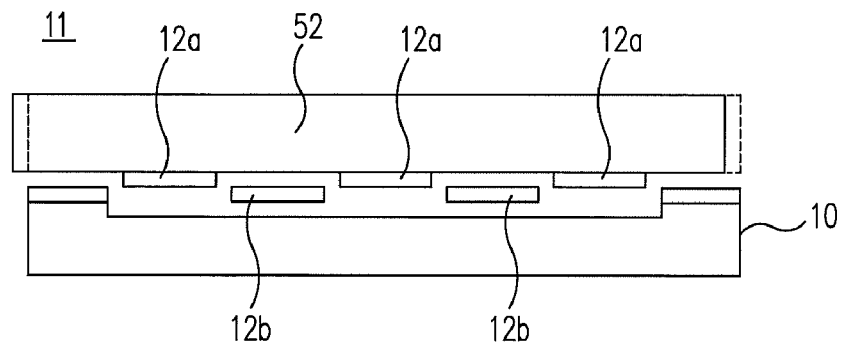
FIG. 4b is a schematic illustration of one embodiment of the stage at a second step in actuation.
Figure 4C:
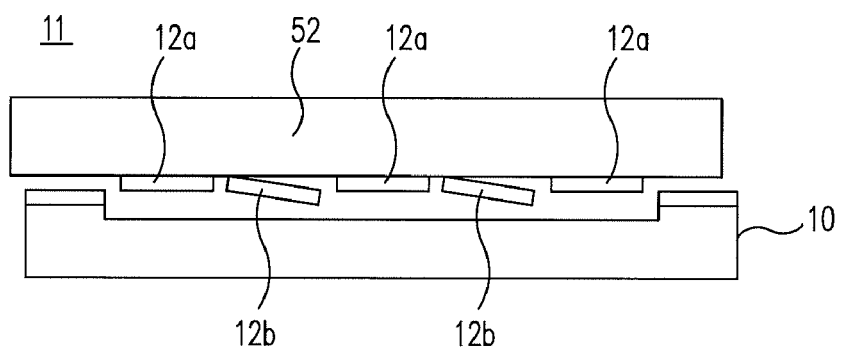
FIG. 4c is a schematic illustration of one embodiment of the stage at a third step in actuation.
Figure 4D:
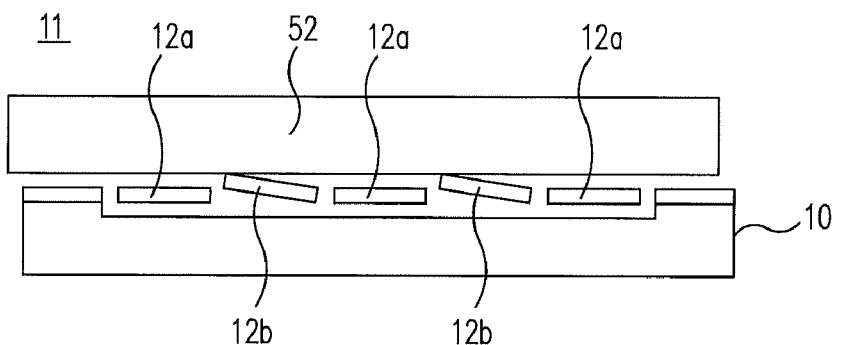
FIG. 4d is a schematic illustration of one embodiment of the stage at a fourth step in actuation.

In the method of actuating the motion stage 11 described above, the movable mount 52 may move between each cycle, since there is a time in which the flaps 12 are not in contact with the movable mount 52. FIGS. 4a, 4b, 4c, and 4d show a method of actuating the motion stage 11 according to a second embodiment of the current invention. In a first step, the voltage signal on a first group of flaps 12a is changed from ground to a positive potential between 1 Volt and 300 Volts, while the voltage signal on a second group of flaps 12b is maintained at 0 Volts. As a result, only the first group of flaps 12a rotate about the flexures 14 until one edge contacts the movable mount 52, as shown in FIG. 4a. Once this contact happens, the friction between the flaps 12a and the movable mount 52 causes the movable mount 52 to move laterally as the flaps 12a continue to move towards the movable mount 52, as shown in FIG. 4b. In a second step, the voltage signal on the second group of flaps 12b is changed from ground to a positive potential between 1 Volt and 300 Volts, while the voltage signal on said first group of flaps 12a is maintained at their previous potential between 1 Volt and 300 Volts. As a result, the second group of flaps 12b rotate about the flexures 14 until one edge contacts the movable mount 52, as shown in FIG. 4c. In a third step, substantially at the same time that the second group of flaps 12b contact the movable mount 52, the voltage signal on the first group of flaps 12a is returned to 0 Volts. As a result, the first group of flaps 12a return to their undeflected position and the second group of flaps 12b continue to move and displace the movable mount 52 laterally, as shown in FIG. 4d. The timing between the actuation of the first group of flaps 12a and the second group of flaps 12b can be tuned to modify the amount of time that the movable mount 52 is allowed to move between said second and third steps.

Figure 5A:
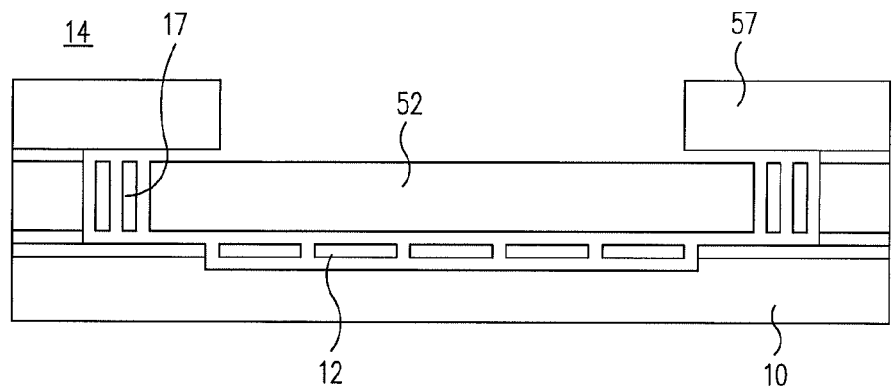
FIG. 5a is a cross-section schematic illustration of the stage according to the preferred embodiment of the present invention.
Figure 5B:
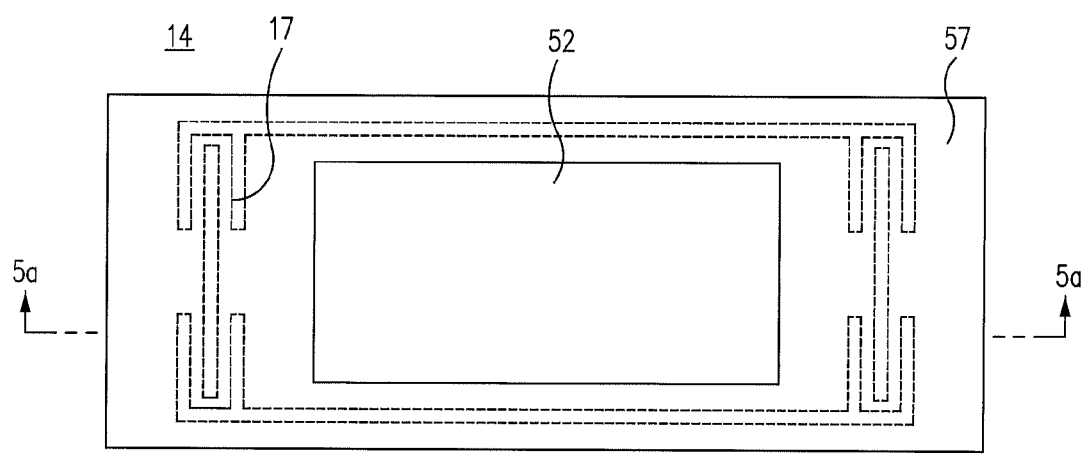
FIG. 5b is a top-view schematic illustration of the stage according to the preferred embodiment of the present invention.

FIG. 5a shows a cross-section illustration of a packaged motion stage 14 according to one embodiment of the current invention. The packaged motion stage 14 is composed of a base plate 10, a movable mount 52, and a cover 57. FIG. 5b shows a top view of the packaged motion stage 14, where the movable mount 52 is visible through the cover 57. Flexures 17 connect the movable mount 52 to the frame on the stage. In other embodiments, flexures 17 are eliminated and the frame functions as a guide for the movable mount 52. In these embodiments, the guided stage is similar to a standard commercial stage that uses guides and ball bearings to restrict the motion of the stage. In one embodiment, the base plate 10 and the movable mount 52 are fabricated using silicon micromachining techniques. In one embodiment of the current invention, the actuator is made using bulk micromachining of silicon. One of ordinary skill in the art can recognize that the same structures could be made using injection molding, surface micromachining, LIGA, laser etching, or any other suitable method. In the current embodiment, the base plate 10 is fabricated using a silicon on insulator (SOI) wafer that is made up of a silicon epilayer on top of a silicon dioxide epilayer on top of a polished silicon wafer. The flaps 12 are shaped by etching the silicon epilayer, and they are released from the substrate by selectively etching the underlying silicon dioxide. In order to prevent capillary adhesion, oxide bumps are patterned on the surface of the flaps 12.

The epilayer is electrically contacted by depositing an aluminum pad that creates ohmic contact with the epilayer. The epilayer has the required doping to make it substantially electrically conductive. The movable mount 52 is made from a double side polished silicon wafer by patterning and etching using deep reactive ion etching (DRIE). The movable mount 52 is electrically contacted by depositing an aluminum pad that creates ohmic contact with the silicon. A thin oxide may be grown on the surface of the movable mount 52 to prevent electrically shorting with the flaps 12 during actuation. In the current embodiment, the base plate wafer and the movable mount wafer are bonded together, and the devices are singulated by dicing. A cap 57 is fabricated using precision plastic injection molding, placed over the motion stage, and glued in place.

All current embodiments that have been described provide motion in a single direction. Clearly, flaps 12 oriented in the opposite direction could be added to provide motion in two directions, but the surface area would then have to be shared between the two types of flaps 12, thereby reducing the force available by a factor of two. By making a flap 12 that can be actuated in two different directions, as shown in FIGS. 6a, 6b, 7a, and 7b, it is possible to enable movement in two directions without reducing the force by a factor of two. The flap 12 in this embodiment is composed of three parts 15a, 15b, 16. Two parts 15a and 15b on opposing ends of the flap 12 are supported to the central part 16 with flexures 14a and 14b that are stiff in every degree of freedom except for one rotational degree of freedom corresponding to the motion shown in FIG. 6a and FIG. 7a. The central part 16 is supported to the substrate 56 with flexures that are stiff in every degree of freedom except for one translational degree of freedom corresponding to motion towards the movable mount 52, as shown in FIGS. 6b and 7b.

Figure 6A:
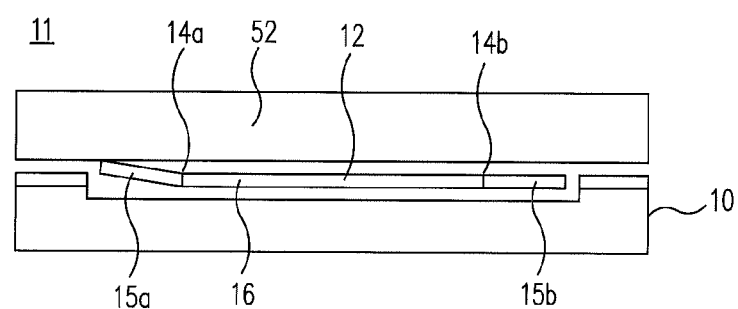
FIG. 6a is a schematic illustration of one embodiment of the stage at a first step in actuation.
Figure 6B:
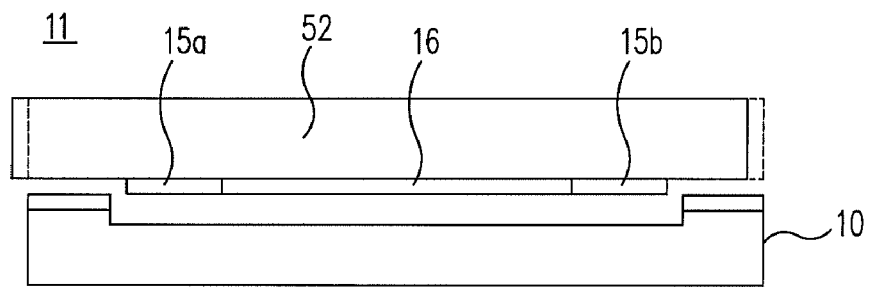
FIG. 6b is a schematic illustration of one embodiment of the stage at a second step in actuation.
Figure 7A:
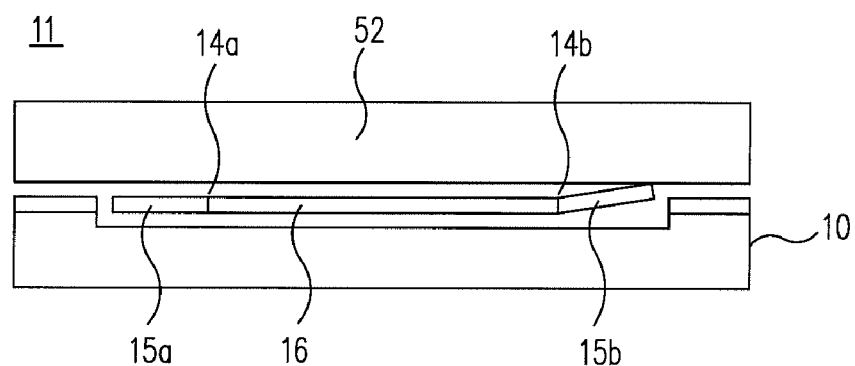
FIG. 7a is a schematic illustration of one embodiment of the stage at a first step in actuation.
Figure 7B:
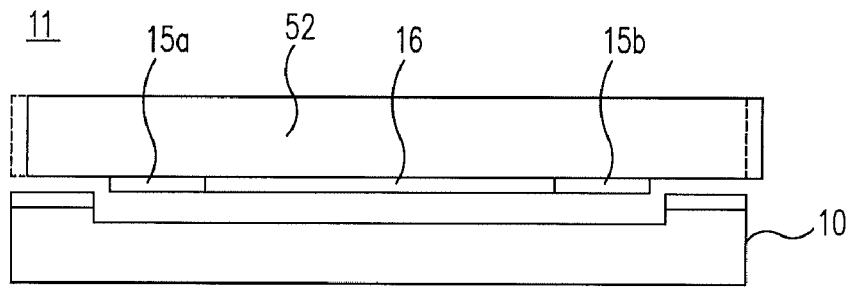
FIG. 7b is a schematic illustration of one embodiment of the stage at a second step in actuation.

FIGS. 6a and 6b show a method of actuating the motion stage 11 in one direction according to one embodiment of the current invention. In a first step, the voltage signal on the first part of the flap 15a and the center part of the flap 16 is changed from ground to a positive potential between 1 Volt and 300 Volts. As a result, the first part of the flap 15a rotates about the flexure 14a until one edge contacts the movable mount 52, as shown in FIG. 6a. Once this contact happens, the friction between the first part of the flap 15a and the movable mount 52 causes the movable mount 52 to move laterally as the central part of the flap 16 moves towards the movable mount 52, as shown in FIG. 6b. In a second step, the voltage on the first portion of the flap 15a and the center portion of the flap 16a is returned to 0 Volts and the flap 12 separates from the movable mount 52 to move back into its unbiased position. This cycle is repeated to continue to move the movable mount 52 laterally. FIGS. 7a and 7b show the cycle to move the stage in the opposite direction. The central part of the flap 16 provides force independent of the direction of motion.

Having thus described embodiments of the present invention, persons skilled in the art will recognize that changes may be made in form and detail without departing from the spirit and scope of the invention. For example, the above description showed the flaps formed in the base plate for moving a mount located above the flaps. However, the present invention can also be used with the flaps formed on the movable mount, such that action by the flaps in the manner described above causes the flaps to contact the underlying base plate, resulting in movement of the mount relative to the base plate. Thus the invention is limited only by the following claims.

What is claimed is:

1. A method of moving an element having a planar lower surface using a micro electro-mechanical actuator, the method comprising:
    providing a planar substrate having a planar upper surface and a planar moveable flap formed therein,
    suspending the element above the substrate such that the lower surface of the element is disposed parallel to the upper surface of the substrate and is spaced apart therefrom by a constant distance;
    bringing a first portion of the planar movable flap into contact with the lower surface of the element; and,
    bringing a second portion of the flap into contact with the lower surface of the element such that the second portion of the flap is disposed against and substantially parallel to the lower surface of the element and causes the element to move laterally relative to the substrate; wherein
    the bringing of the first and second portions of the flap into contact with the surface are respectively effected through first and second electrostatic forces acting between the flap and the element, and
    the field strength of the second electrostatic force is greater than that of the first electrostatic force.

2. The method of claim 1, wherein the bringing of the first and second portions of the flap into contact with the surface comprises applying a first voltage to the flap.

3. The method of claim 2, wherein the bringing of the first and second portions of the flap into contact with the surface further comprises applying a second voltage to the surface, the second voltage being different than the first voltage.

4. The method of claim 3, wherein the second voltage comprises approximately 0 volts.

5. The method of claim 1, further comprising moving the flap away from the surface.

6. The method of claim 5, wherein the moving comprises reducing the voltage on the flap to approximately 0 volts.

7. The method of claim 5, further comprising repeating the bringing and moving to effectuate continued movement.

8. The method of claim 5, further comprising alternating the bringing and moving between two sets of flaps.

9. The method of claim 1, wherein the first portion of the flap is more freely movable than the second portion.

10. The method of claim 1, further comprising suspending the element relative to the flap such that the element is substantially constrained against all but lateral movement.

11. The method of claim 10, wherein the suspending of the element relative to the flap comprises suspending the element by one or more flexures.

\* \* \* \* \*